United States Patent [19]

Hammond et al.

[11] Patent Number: 4,714,809
[45] Date of Patent: Dec. 22, 1987

[54] METHOD AND APPARATUS FOR SHAPING THE SURFACES OF CAMS ON A CAMSHAFT

[75] Inventors: Michael R. Hammond, Clawson; Donald E. Novorsky, Pleasant Ridge, both of Mich.

[73] Assignee: Tocco, Inc., Boaz, Ala.

[21] Appl. No.: 896,965

[22] Filed: Aug. 15, 1986

[51] Int. Cl.$^4$ .............................................. H05B 6/40
[52] U.S. Cl. ........................... 219/10.43; 219/10.49 R; 219/10.57; 266/129; 148/150
[58] Field of Search ...................... 219/10.43–10.49 R, 219/10.57–10.67; 266/129; 148/147, 148, 150

[56] References Cited

U.S. PATENT DOCUMENTS

| | | | |
|---|---|---|---|
| 3,967,089 | 6/1976 | Seulen et al. | 219/10.67 |
| 4,604,510 | 8/1986 | Laughlin et al. | 219/10.43 |
| 4,618,125 | 10/1986 | Balzer | 266/90 |

Primary Examiner—Philip H. Leung
Assistant Examiner—L. K. Fuller
Attorney, Agent, or Firm—Body, Vickers & Daniels

[57] ABSTRACT

A method and apparatus for shaping, in a planar direction, an elongatd generally flat surface formed in a steel workpiece and having a geometric continuous configuration, such as the outer facing surface of a cam on a camshaft for an internal combustion engine, which involve providing an inductor having a generally continuous heating surface matching the cam surface and generally parallel with the cam surface, forming at least one elongated uniformly cross-section groove in the inductor heating section and extending in a preselected linear location with respect to the heating surface and coterminous with the inductor heating surface, positioning the camshaft with the cam surface facing the parallel matching heating surface of the inductor with an air gap between the parallel matching surfaces so that the groove in the inductor surface faces a preselected band of the cam surface, such as the middle portion of the cam surface, energizing the inductor with a current having a frequency of less than about 25 KHz for a time less than about 3.0 seconds with a power density of about 20–70 KW/in$^2$, at the cam surface, whereby the steel surface is heated to a temperature above the hardening temperature of the cam surface, with the higher power density at the outer edges of the cam surface, and immediately quench hardening the cam surface with a liquid quenching substance whereby the flatness of the cam surface is controlled by the position of the elongated groove. An equivalent result can be accomplished by other arrangements for changing the heating effect and particular band around the cam surface preparatory to immediate quench hardening.

30 Claims, 11 Drawing Figures

METHOD AND APPARATUS FOR SHAPING THE SURFACES OF CAMS ON A CAMSHAFT

The present invention relates to the art of induction heating and more particularly to a method and apparatus for shaping the surfaces of cams on a camshaft by induction heating and subsequent quench hardening.

BACKGROUND OF THE INVENTION

The present invention is particularly applicable for shaping the outer surface of a cam on a camshaft used in an internal combustion engine and it will be described with particular reference thereto; however, the invention is much broader and can be used for shaping, in a planar direction, many elongated, generally flat surfaces formed in a workpiece of hardenable steel and having a geometrically continuous configuration on the workpiece. For instance, a cam of a camshaft has a continuous elongated surface extending around the camshaft even though this surface has a different radial spacing at the heel of the cam than it does at the nose of the cam. This cam surface is a continuous, elongated surface extending circumferentially around the camshaft. Other similar elongated surfaces can be envisioned for use of the present invention, such as internal generally flat cam surfaces and generally flat surfaces extending in a circular path, such as found on cam face plates. The term "generally flat" used to define a surface means that a flat plane extending across the elongated surface and orthogonal to the elongated direction or path of the surface intersects the surface at a line that is generally straight. This generally straight line of intersection may have a slight bow or curve but still be generally flat, such as a transverse crown on a cam surface.

Turning now to the preferred use of the present invention, the cam surfaces of camshafts must have a given profile laterally across the surface and must have a sufficient hardness to withstand continuous wear from lifter rods or valves. This is especially true with the more strenuous demands of high speed engines using roller lifters. It has been known for many years that the cam surfaces can be inductively heated and then quench hardened to produce the desired surface hardness. In the induction heating process, the temperature of the metal adjacent the cam surface is raised to a value above the critical temperature, A3, of the steel forming the surface so that subsequent quench hardening before cooling causes the desired hardness over the surface. Recently, manufacturers have followed assignees' initiative and have developed machines that position the cam of a camshaft in a circular inductor which inductor, or coil, is then energized by a high frequency (10-25 KHz) at a high power density (20-70 KW/in$^2$ at the surface) for a short time (less than about 3.0 seconds and preferably less than 2.0 seconds). In this manner, the temperature of the cam surface is increased rapidly for immediate quench hardening by a liquid, such as a low polymer solution. Thereafter, the next adjacent cam is indexed into the heating coil for hardening of that next adjacent surface. The current used is less than about 25 KHz and the heating time is generally less than about 3.0 seconds. The power density in the more recently developed induction heating machinery is about 50 KW/in$^2$ at the cam surface during the heating operation or cycle. This equipment employs a relatively high power density which causes a rapid increase in temperature adjacent the surface to be hardened. In some instances the camshaft is rotated within the circular inductor during the heating and/or quenching cycle.

In accordance with one relatively successful prior process, the camshaft is indexed to a selected position within the coil so that the nose of the cam faces the insulation gap of the coil, while the heel of the cam is diametrically opposite to this insulation gap. In this indexed position, the heating of the cam surface is controlled. The decrease in heating caused by the gap necessary in most induction heating inductors is offset by the fact that the nose is closer to the surface of the inductor than is the heel. This high energy induction heating process has been highly successful and is utilized often by the automobile industry for hardening the axially spaced cam surfaces of a camshaft for internal combustion engines.

By using this high energy process, higher power density requires a shorter cycle time; therefore, there is a substantial incentive to use the high power density process in the automobile industry. When this process is used to harden cam surfaces, a distinct, transverse crown is created in the surface of a cam after it has been quench hardened. This inherent crown can be in the neighborhood of 0.0010 to 0.0013 in a cam surface which is about 0.50 inches in axial width and heated with an induction heating coil having a diameter of approximately 2.0 inches. Consequently, high power densities for short cycle times have been found to result in a crowning effect for the generally flat cam surfaces. As previously mentioned, "generally flat" indicates a desire for a flat surface, which surface can have a slight amount of crown without affecting the definition. To remove this crown, it has been practice to grind the surface after hardening. This grinding process is followed by a microstoning process for imparting a preselected polished surface to the cam surface. The use of a grinding operation prior to the stoning operation increases the cost and is required when a large crown has been created by the induction hardening process. This inherent crown tends to increase as the power density, which is needed to reduce cycle length, is increased. Desired parameters are, thus, counteracting each other. The hardening process increases the power to reduce cycle length. This higher power increases the inherent crown and, thus, the machining cost and time needed after the hardening process has been completed.

Not only has the high power density, low cycle time induction heating process caused a greater propensity for crowning the surface, but it has also resulted in a hardness pattern which is more shallow at the lateral edges of the cam surface. Since the requirements by customers regarding hardness patterns generally demand a maximum depth to the hardness pattern over the total surface, the uneven hardness pattern resulting from the high density, low cycle time process has required a reduced induction heating frequency to guarantee a minimum hardness depth over the entire surface. This has exaggerated the crowning effect previously discussed.

THE INVENTION

The present invention relates to a method and apparatus which is particularly applicable for hardening the outer surface of the cams of camshafts for an internal combustion engine. This invention overcomes the disadvantages heretofore experienced in high density, short cycle length induction heating processes performed preparatory to subsequent liquid quench hardening.

In accordance with the present invention, there is provided a method of shaping, in a planar direction, an elongated generally flat surface formed in a workpiece of hardenable steel and having a geometrically continuous configuration on the workpiece. This method comprises providing an inductor having an elongated generally continuous heating surface matching the geometrically continuous configuration of the steel surface and generally parallel with the elongated steel surface; forming at least one elongated, uniformly cross-sectioned groove in the inductor heating surface and extending in a preselected linear location with respect to the inductor heating surface and coterminous with the inductor heating surface; positioning the workpiece with the steel surface facing the parallel, matching heating surface with a separating air gap between the parallel matching surfaces, whereby the groove faces a selected band of the workpiece steel surface; energizing the inductor with a current having a frequency of less than about 25 KHz, for a time less than about 3.0 seconds with a power density of about 20–70 KW/in$^2$ at the steel surface, whereby the steel surface is raised to a temperature above the hardening temperature of the steel; and, then, immediately quench hardening the steel surface with a liquid quenching substance.

By employing the above method, it has been found that the elongated groove extending around the inductor heating surface substantially reduces the crown when the method is employed for inductively heating a cam surface preparatory to quench hardening. This crown has been reduced from about 0.0012 inches to 0.0002–0.0004 inches. Consequently, by using a method, as defined above, the crown normally produced in the surface of a camshaft during high power, low cyle time induction heating has been substantially reduced. In addition, the depth of the heating pattern across the face of a cam surface, from one edge to the other, is substantially uniform; therefore, a generally uniform hardness depth is possible. By using the method, as defined above, it is possible to modify the groove extending around the surface of the inductor to control the flatness and/or shape of the cam surface or other continuous surface in accordance wich a variety of desired objectives. For instance, it is possible to produce a concave surface, instead of a convex or crowned surface. This can be done by increasing the depth of the groove extending around the inductor surface. This novel surface shaping concept is easily accomplished by merely employing a groove, with a selected shape and objective, in the surface of a generally circular induction heating coil of the type normally used for inductively heating cam surfaces preparatory to quench hardening. Proper selection of the goove produces the desired degree of lateral flatness from edge-to-edge of a cam surface. Consequently, the need for subsequent machining of the cam surfaces, to generate the cam surface, can be eliminated. The cam surfaces can be immediately stone ground or polished by Mylar strip in a relatively short period of time after the hardening process has been completed. Polishing does not change the actual profile of the cam surface. It only changes the surface condition.

In accordance with another aspect of the present invention, there is an improvement in an inductor or coil for heating the outer facing, elongated cam surface of an internal combustion engine camshaft which surface has axially spaced edges and a median or center portion. Such an inductor has a generally cylindrical, inwardly facing heating surface with an isolation or insulation gap, or fishtail, wherein the cylindrical surface of the coil or inductor is "circumferentially elongated" and has a circumferentially extending mid-section. The improvement in this type of induction heating coil, as used for cam surfaces, is the provision of a precise offset portion at the mid-section of the heating surface and extending circumferentially around and coterminously with the heating surface. This offset portion of the coil causes heating the median section of the cam surface at a rate substantially different than the heating rate at the spaced edges of the cam surface. This transverse shape or profile of the power density over the cam surface in a planar direction causes a precise final cam profile upon subsequent quench hardening. In accordance with the preferred embodiment of the invention, this unique, shape controlling offset portion of the coil is a circumferentially extending groove having a generally rectangular cross-section. By modifying the normal induction heating coil or inductor used for inductively heating cam surfaces with merely a preselected groove, the advantages mentioned above can be obtained. The hardness level across the surface can be made generally uniform and the surface can be provided with a negligible amount of crowning, even with power densities as high as 50–70 KW/in$^2$.

The primary object of the present invention is the provision of a modified induction heating coil and method of using the same, which coil and method maintain surface flatness across the elongated surface being hardened and produces a uniform hardness pattern from lateral edge-to-lateral edge.

Another object of the present invention is the provision of an inductor or coil and method, as defined above, which coil and method allow cam surfaces of a camshaft to be hardened with a flat profile that reduces the necessity for profile creating grinding of the surfaces after hardening thereof.

Yet another object of the present invention is the provision of a coil or inductor and method, as defined above, which coil or inductor and method can be used to control the profile, contour or shape across a generally flat steel surface while still employing high power and low cycle lengths.

These and other objects and advantages will become apparent from the following description taken together with the accompanying drawings which will hereinafter be described.

PREFERRED EMBODIMENT

Figure 1:
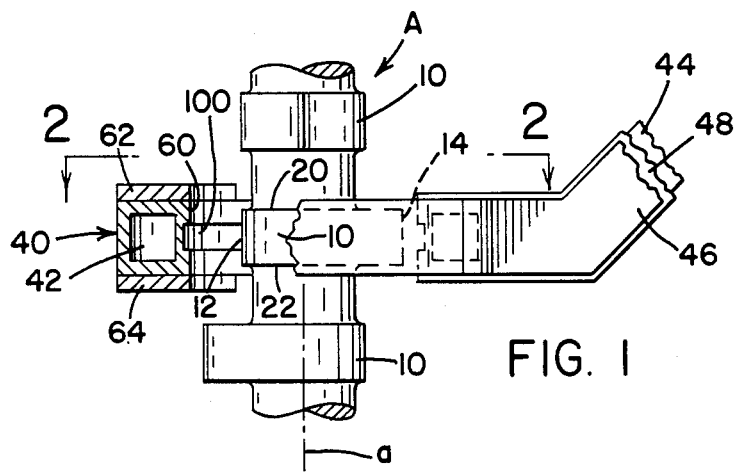
FIG. 1 is a partially cross-sectioned view illustrating the preferred embodiment of the present invention, as used for inductively heating the cam surface of an automotive camshaft.

Referring now to the drawings wherein the showings are for the purpose of illustrating the preferred embodiment of the invention and not for the purpose of limiting the same, FIG. 1 shows a camshaft A adapted to be rotatably mounted about a central axis a and having a plurality of axially spaced cam surfaces 10. Each of these cam surfaces are the same; therefore, only one will be described in detail and this description will apply equally to the other cam surfaces 10, except to the extent that the cams have different radial orientation with respect to axis a. Each cam surface 10 is an elongated, generally flat surface formed around camshaft A which is constructed from a hardenable steel. This surface 10 has a geometrically continuous configuration around camshaft A and is an elongated surface which extends circumferentially around the camshaft. The surface is generally flat for definition purposes, even though it may include a certain amount of crowning, or convex profile in a lateral or transverse direction. This elongated cam surface 10 has a heel portion 12 and a radially outwardly protruding nose portion 14. Consequently, surface 10 has a variable radial spacing at different locations around axis a. Edges 20, 22 define the axial extremities of surface 10. These two edges are parallel so that the width of elongated surface 10 is the same at all locations around axis a.

Figure 3:
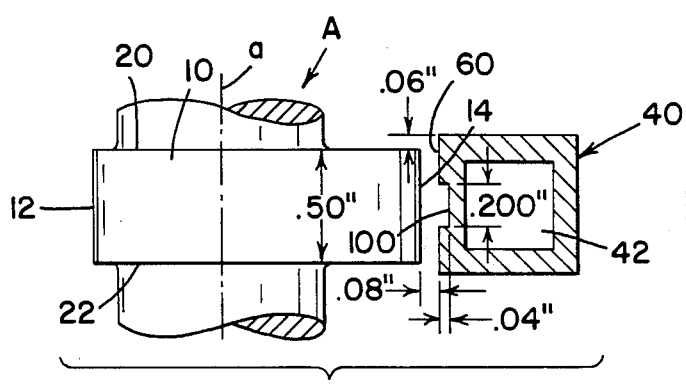
FIG. 3 is an enlarged view taken generally along line 3—3 of FIG. 2.

To heat inductively surface 10, it is common practice to provide a generally circular inductor 40 having an internal coolant chamber 42 and power leads 44, 46 separated by an insulation material 48. This insulation material defines an isolation or insulation gap 50, known as a "fishtail" to allow current flow around cylindrical heating surface 60, which is a flat surface, as this term is used in this application, and faces inwardly toward surface 10. Surface 60 is generally parallel to surface 10 in that a plane taken through axis a will show surface 10 and surface 60 as parallel lines, as shown in FIGS. 1 and 3. Even though the surfaces are parallel, they are not evenly spaced. Heel 12 has a larger air gap or spacing than the air gap or spacing at nose portion 14.

Figure 2:
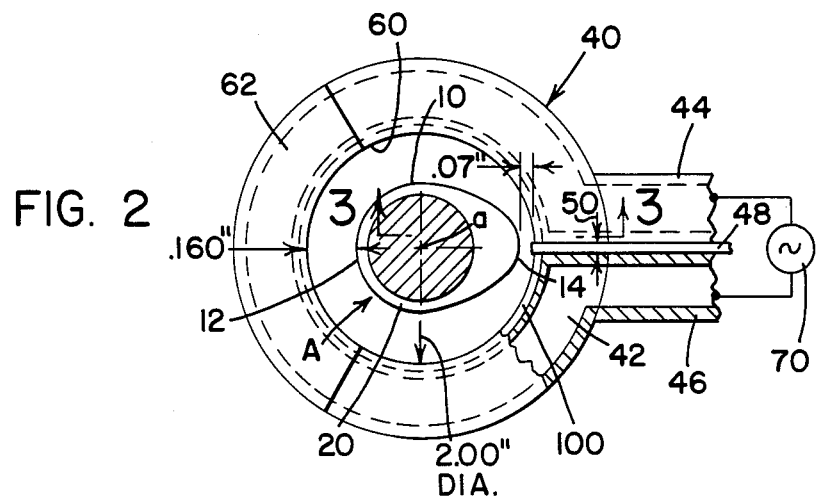
FIG. 2 is a cross-sectional view taken generally along line 2—2 of FIG. 1.

In accordance with the preferred embodiment of the invention, the dimensions of cam surface 10 and inductor 40 are shown in FIGS. 2 and 3. To harden surfaces 10, camshaft A is indexed axially along axis a until a surface 10 is centrally located within surface 60, as shown in FIGS. 1 and 3. The camshaft is also indexed radially until nose 14 is directly opposite gap 50, as best shown in FIG. 2. In this manner, the reduced heating effect occurring at gap 50 is available to heat nose 14 which has the smallest air gap. This alignment concept produces uniform heating around the surface 10. To increase the heating at heel 12, two high permeability plates 62, 64 are arcuately shaped and are secured on opposite axial ends of coil, or inductor 10, at a location adjacent heel 12, as best shown in FIGS. 1 and 2. These arcuate plates act as flux concentrators to assist in heating the heel portion of surface 10 which has the greatest air gap from inductor surface 60. After surface 10 has been axially and radially indexed, power supply 70 is energized for a time less than about 3.0 seconds. Preferably and before the present invention the cycle length was less than 2.0 seconds. Power supply 70 is a solid-state inverter having an output in the range of about 10–25 KHz and with a power rating sufficient to create a power density at surface 10 of about 20–70 KW/in$^2$. In the past, power supply 70 had an output of 10 KHz with a power density of 50 KW/in$^2$ for a cycle length of 1.3 seconds. Immediately after induction heating, liquid is sprayed against the surface 10 for quench hardening the cam surface. The heating pattern or profile within the metal directly adjacent surface 10, at the quenching time, is indicative of the ultimate heating pattern accomplished by the induction heating and quench hardening process. In some installations, quenching liquid is actually directed through inductor 40 against surface 10. This known technology employs an integral quench inductor wherein coolant passages are separate from internal quenching liquid passages. The quenching liquid is usually a polymer liquid having a concentration of about 4%.

Figure 4:
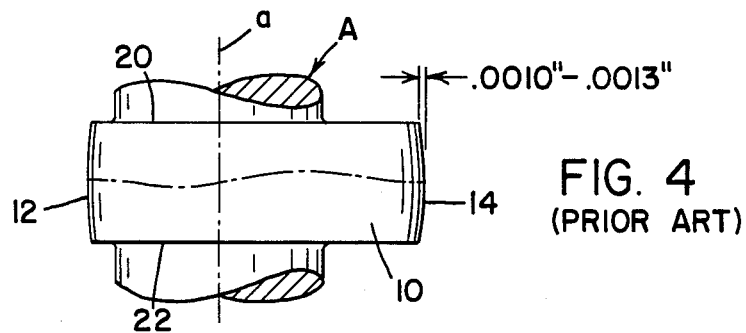
FIGS. 4–7 are construction views showing certain characteristics of a cam surface hardened by induction heating and subsequent liquid quenching utilizing high power density and low cycle times.
Figure 5:
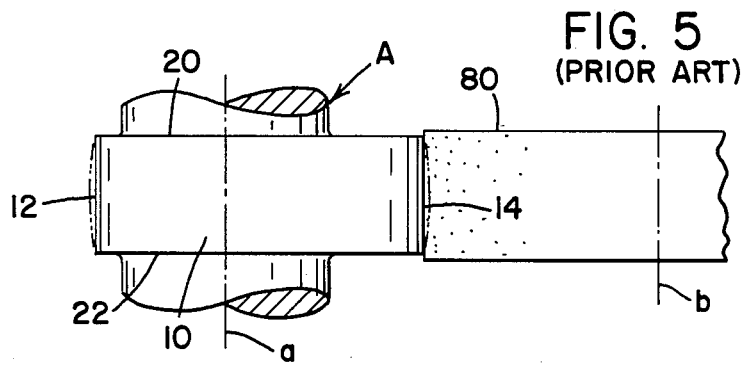
Figure 6:
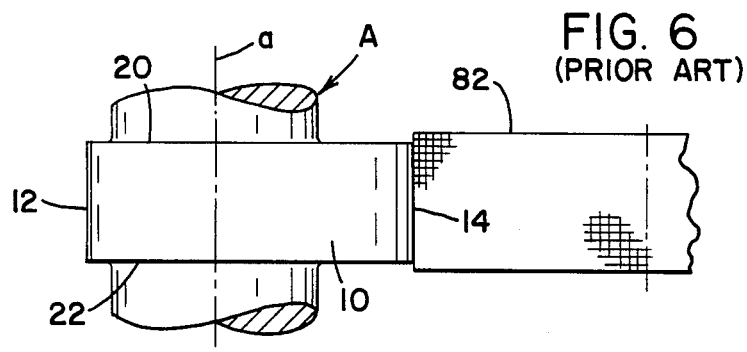

As so far described, the preferred embodiment of the present invention does not differ from prior procedures for inductive heating and quench hardening cam surfaces 10. By using this prior hardening process, it has been found that a crown of about 0.0010 or slightly more is created across surface 10. This inherent crown is schematically illustrated in FIG. 4. To remove this crown, surface 10 must be machined by grinding. This process actually changes the profile of surface 10 and is schematically illustrated as being accomplished by grinding wheel 80 in FIG. 5. This grinding operation removes the excess material at the mid-section of surface 10. As shown in FIG. 4, the crown can undulate around surface 10 so that crowning variations along the surface may not be the same at all circumferential locations. After the grinding operation, it is necessary then to polish surface 10, such as by a stoning operation accomplished with a stone 82, shown in FIG. 6. After this post hardening machining, the resulting hardness pattern is pattern B shown in FIG. 7. This hardness pattern is concaved inwardly so that edges 20, 22 have a lesser hardness depth. Consequently, the hardening process must be controlled so that the minimum hardness depth at these edges meets the criteria of the customer. This results in a deeper pattern in the center of surface 10 than the depth really required. Such deeper pattern has a tendency to increase cost and decrease cycle time. Indeed, it also increases the amount of unwanted crowning.

Figure 8:
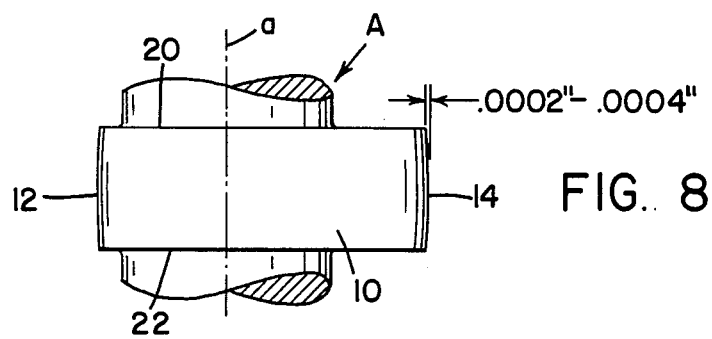
FIGS. 8–10 are illustrations similar to FIGS. 4–7 and illustrating advantageous results accomplished by practicing the present invention; and, FIG. 11 illustrates a modification of the preferred embodiment of the present invention and illustrating a characteristic of the general surface shaping concept of the present invention.
Figure 9:
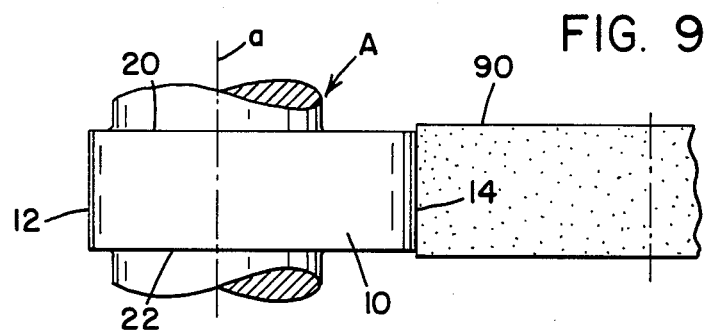

In accordance with the present invention, surface 60 is modified to include a circumferentially extending groove 100, best shown in FIGS. 1 and 3. This groove has a rectangular cross-section, in the preferred embodiment, and is centrally located with respect to surface 10 so that the median portion of surface 10, between edges 20, 22, is directly opposite to the groove. By hardening surface 10 with inductor or coil 40 modified with a central groove 100, the shape or profile across surface 10, between edges 20, 22, is controlled to remove the crown or to provide whatever lateral profile desired on surface 10 within prescribed limitations. Thus, this unique groove extending circumferentially around inductor surface 60 performs a shaping operation whereby, after quench hardening, the resulting crown is reduced from 0.0013 to a range of 0.0002–0.0004. This concept is schematically illustrated in FIG. 8. This amount of crowning is negligible and surface 10 is substantially flat. Thus, surface 10 need only be polished with a Mylar wheel 90 or stone 82 shown in FIG. 6. There is no need to remove material to create a new surface profile; therefore, only an easily performed polishing operation is required if any post hardening machining is needed.

Figure 10:
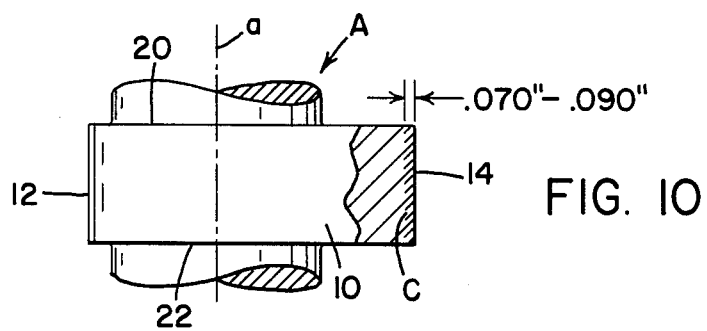

As shown in FIG. 10, a hardness pattern C is provided across surface 10 between edges 20, 22 which pattern is substantially uniform and has a depth of about 0.070–0.090. This uniform heating pattern allows reduction of the cycle time and/or increased frequency. In practice, the heating operation is accomplished in 0.9 seconds. In the prior art process the cycle time is generally 1.3 seconds. By utilizing the present invention, the cycle time can be reduced; however, more importantly, surface 10 retains its original straight condition.

Figure 11:
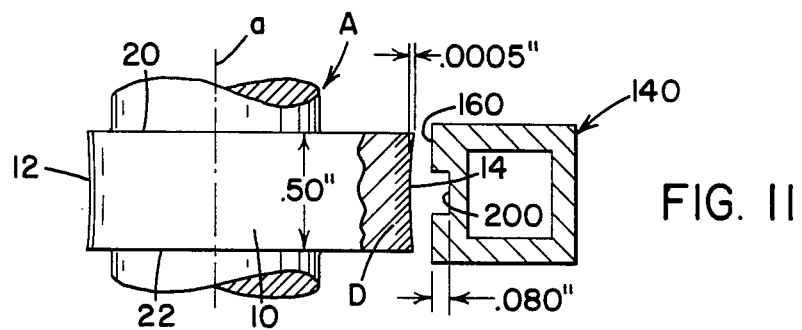

Referring now to FIG. 11, groove 200 in cylindrical heating surface 160 of inductor 140 is twice as deep as groove 100 in inductor 40. The preferred dimensions are shown on the drawing. It has been found that when this deeper groove is provided, surface 10 actually has an axial concave shape, as contrasted to an axial convex shape or crown. In practice, this concavity is approximately 0.0005 inches, as set forth in FIG. 11. Hardness pattern D is generally uniform between parallel edges 20, 22 as in pattern C. By merely changing the depth of the circumferentially extending groove in the heating surface of the induction heating inductor or coil, the actual shape of the hardened surface 10 can be controlled. This new concept of surface shaping can be used to decrease the detrimental crown found in the prior art whenever crowning is not desired. The shaping concept can be used to produce a concave surface when desired. This ability to control surface by merely changing the dimensions of a center groove is a substantial advantage over any arrangements previously known for inductively hardening the outwardly facing cam surfaces of camshafts. By utilizing this invention, the tremendous advantages of high power density, low cycle time can be realized without increasing the necessity for subsequent grinding or machining of the hardened cam surfaces.

In practice, several examples have been obtained. By providing an input power of 120 kilowatts for the heating cycle of 0.9 seconds, quenching with a 4% polymer at 80° F., the resulting surface 10 had a crown of 0.0002.

Figure 7:
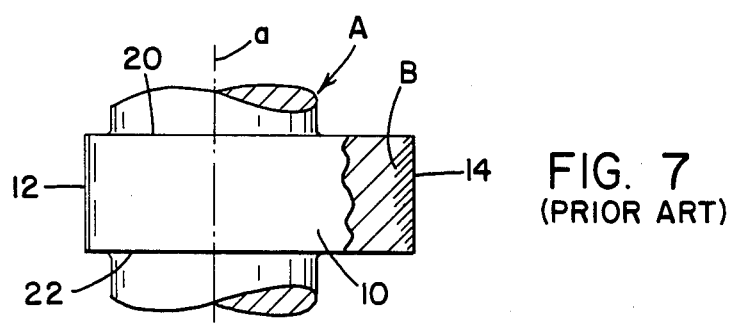

As can be seen from a comparison of the heating patterns B, C, and D, the present invention is useful in shaping the lateral contour of the elongated surface 10 forming the bearing or wear surface of a camshaft. The hardness is sufficiently high as required when utilizing roller type valve lifters. The invention allows intentional and controlled shaping of the lateral contour in a cam surface in a manner to accomplish many objectives. For instance, an unwanted crown can be reduced or eliminated by using a circumferentially extending groove. The transverse or lateral shape can be a convexed configuration as shown in FIG. 11 by increasing the depth of the groove. The exact physical and metallurgical properties causing the phenomena of the invention to perform precise surface shaping as explained in this application is not precisely known. It is believed that edges 20, 22 allow heat radiation so that the heating pattern resulting in hardness pattern B of FIG. 7 is deeper in the center of surface 10 where heat radiation is not as high as the edges. By having a deeper hardness pattern in the center, more martensite is formed in the center of surface 10. This can cause grain growth in the center. Consequently, expansion during heating is frozen when quenched to develop a crown. By providing increased heating at edges 20, 22, the heat pattern or profile can be made more flat by compensating for edge radiation and, thus, resulting in a uniform hardness pattern C shown in FIG. 10. In this heating pattern, martensite is evenly distributed from edge 20 to edge 22. There is no tendency for the center portion of the surface 10 to expand. Consequently, the crown is reduced. Under this theory, the invention employs two metallurgical characteristics. The first characteristic is to heat the edges so that the energy input balances the energy dissipated by radiation. This creates an even heat pattern or profile before the quench hardening. Quench hardening must be done without substantial delay and should be done immediately to freeze the uniform heat profile into a hardness pattern of the same uniform depth. Using this same theory, FIG. 11 allows an excess heat input at edges 20, 22 to substantially overcome radiant energy loss at edges 20, 22. This radiant energy loss at the edges also reduces the temperature of the mass behind the edge portion of surface 10; therefore, there is a certain increase in conduction by adjacent cooled mass during the heating process. The increased mass conduction is not experienced at the center portion of surface 10. Consequently, the heat energy adjacent edges 20, 22 in FIG. 11 is greater than the heat energy at the center portion of surface 10 by an amount substantially exceeding the radiant heat loss and the increased conduction heat loss, both losses of which are caused by the exposed edges 20, 22. In reducing the crown as shown in FIG. 10, the increased energy input at edges 20, 22 is generally sufficient to balance the radiant loss and increase mass conduction so that the existing temperature at the edges is generally the same and to the same depth as the temperature at the center of surface 60 just before liquid quenching. This provides a flat surface 10.

As an alternative to the method, a frequency of 50 KHz has been used with a lesser contouring effect. Less than about 25 KHz is preferred. This same process can be used to provide a crown on the outer edges of gear teeth by hardening with an encircling inductor 40. The gear surfaces can be heated with an inwardly stepped or contoured surface 60 to produce a deeper heated zone at the axial center to create a contoured volumetric growth during austenitic to martensitic transformation during quenching thereby obtaining a crowned involute. This process and crown created thereby is desirable to minimize tooth contact.

Having thus described the foregoing invention, it is claimed:

1. As method for controlling the shape of a generally linear elongated steel surface formed in a work piece of hardenable steel, said steel surface extending between and contiguous with edge surface defining the ends of said steel surface, each edge surface having a predetermined, peripheral configuration, said method comprising:
   (a) providing an inductor having a generally linearly elongated continuous heating surface configured generally similar to said steel surface and generally parallel therewith;
   (b) providing at least one elongated uniformly cross-sectioned groove in said inductor heating surface and extending in a preselected linear location with respect to said inductor heating surface;
   (c) positioning said work piece with said steel surface facing said heating surface with an air gap between said heating and steel surfaces with said groove facing a selected band of said work piece steel surface;

(d) energizing said inductor with a current having frequency of less than about 50 KHz for a time less than about 3.0 seconds with a power density of about 20–70 KW/in$^2$ at said steel surface whereby said steel surface is raised to a temperature above the hardening temperature of said steel at a rate which is different for said selected band of said steel surface than that for the remainder of said steel surface; and, (e) immediately quench hardening said steel surface with a liquid quenching substance whereby the shape of said steel surface is controlled.

2. A method as defined in claim 1 wherein said steel surface faces radially outwardly and said heating surface faces radially inwardly.

3. A method as defined in claim 2 wherein said steel surface is a cam surface of a camshaft rotatable about a central axis.

4. A method as defined in claim 3 wherein said heating surface is cylindrical.

5. A method as defined in claim 4 wherein said groove is provided at the mid-portion of said heating surface.

6. A method as defined in claim 5 wherein said groove is a generally rectangular cross-section.

7. A method as defined in claim 1 wherein said steel surface is a cam surface of a camshaft rotatable about a central axis.

8. A method as defined in claim 1 wherein said heating surface is cylindrical.

9. A method as defined in claim 1 wherein said groove is provided at the mid-portion of said heating surface.

10. A method as defined in claim 9 wherein said steel surface is a cam surface of a camshaft rotatable about a central axis.

11. A method as defined in claim 10 wherein said heating surface is cylindrical.

12. A method as defined in claim 11 wherein said groove is provided at the mid-portion of said heating surface.

13. A method as defined in claim 12 including the further step of:

(f) finishing said cam surface flat by only the step of polishing said cam surface.

14. A method as defined in claim 7 including the further step of:

(f) finishing said cam surface flat by only the step of polishing said cam surface.

15. A method as defined in claim 9 including the further step of:

(f) grinding said cam surface flat.

16. A method as defined in claim 1 including the further step of:

(f) grinding said cam surface flat.

17. In an inductor for heating the outwardly elongated facing surface of an internal combustion camshaft, said surface having axially spaced edges and a median portion, said inductor having a generally cylindrical, inwardly facing heating surface with an isolation gap, said surface being circumferentially elongated with a circumferentially extending mid-section, the improvement comprising: said heating surface having an offset portion at its mid-section extending circumferentially thereabout for heating the median section of said cam surface at a rate substantially different than said spaced edges of said cam surface to thereby shape said cam surface in a planar direction upon subsequent quench hardening.

18. The improvement as defined in claim 17 wherein said offset portion is a circumferentially extending groove.

19. The improvement as defined in claim 18 wherein said groove is generally rectangular in cross-section.

20. The improvement as defined in claim 19 wherein said heating surface further includes a section of high permeability material on said surface at a predetermined position for controlling the field intensity at a given circumferential position on said cam surface.

21. The improvement as defined in claim 18 wherein said groove is generally rectangular in cross-section.

22. The improvement as defined in claim 17 wherein said groove is generally rectangular in cross-section.

23. An apparatus for hardening the cam surfaces of a camshift of an internal combustion engine, said cam surface having a protruding nose, said apparatus comprising: an induction heating inductor having an inwardly facing cylindrical coil surface and an isolation gap, said coils surface having a groove extending therearound; means for locating one of said cam surfaces in said coil with said coil surface spaced slightly from said cam surface and with said nose facing said gap; means for energizing said inductor with current having a frequency of less than about 25 KHz for a time less than about 3.0 seconds with a power density of about 20–70 KW/in$^2$ at said cam surface until said cam suface is above its critical hardening temperature; and means for immediately quenching said cam surface with a liquid.

24. The apparatus as defined in claim 23 wherein said groove is generally rectangular in cross-section.

25. The apparatus as defined in claim 23 including a section of high permeability material on said inductor at a position to control the field intensity at a given circumferential position on said cam surface.

26. A method of hardening the outwardly facing cams surface of a camshaft for an internal combustion engine, said cam surface having a center portion between two edges, each edge defined by an edge surface intersecting said cam surface with each edge surface parallel to one another, said method comprising the steps of:

(a) inductively heating said cam surface with an inductor having a substantially different heat energy level at said cam surface edges than the heat energy level at said cam surface center portion, said energy levels exceeding about 20 KW/in$^2$ for less than 3.0 seconds; and, (b) immediately quench hardening said cam heated surface with a liquid.

27. A method as defined in claim 26 wherein the total heat energy is between 20–70 KW/in$^2$.

28. A method as defined in claim 27 wherein said different heat energy level is substantially greater than said heat energy level at said cam surface center portion.

29. A method as defined in claim 28 wherein said different heat energy level differs from said heat energy level at said cam surface center portion by an amount generally equivalent to radiant and excess conduction heat energy loss caused by said parallel edges.

30. A method as defined in claim 26 wherein said different heat energy level differs from said heat energy level at said cam surface center portion by an amount generally equivalent to radiant and excess conduction heat energy loss caused by said parallel edges.

* * * * *